United States Patent [19]
Blanton et al.

[11] 4,259,176
[45] Mar. 31, 1981

[54] RESTRICTING SILICA CONTENT OF CATALYST INVENTORY TO PREVENT ALUMINA POISONING FOR $SO_x$ CONTROL

[75] Inventors: William A. Blanton, Woodacre; Robert L. Flanders, San Anselmo, both of Calif.

[73] Assignee: Chevron Research Company, San Francisco, Calif.

[21] Appl. No.: 74,838

[22] Filed: Sep. 13, 1979

Related U.S. Application Data

[63] Continuation-in-part of Ser. No. 967,048, Dec. 6, 1978, abandoned.

[51] Int. Cl.³ .................. C10G 11/05; C10G 11/18
[52] U.S. Cl. .................................... 208/120; 252/417; 252/455 Z; 423/244
[58] Field of Search ................... 208/120; 423/244

[56] References Cited

U.S. PATENT DOCUMENTS

| | | | |
|---|---|---|---|
| 4,071,436 | 1/1978 | Blanton et al. | 208/120 |
| 4,107,032 | 8/1978 | Chester | 208/120 |
| 4,115,249 | 9/1978 | Blanton et al. | 208/120 |
| 4,115,250 | 9/1978 | Flanders et al. | 208/120 |
| 4,115,251 | 9/1978 | Flanders et al. | 208/120 |
| 4,182,693 | 1/1980 | Gladrow | 208/120 X |

Primary Examiner—Delbert E. Gantz
Assistant Examiner—G. E. Schmitkons
Attorney, Agent, or Firm—D. A. Newell; W. H. Hooper; W. D. Reese

[57] ABSTRACT

Removal of sulfur oxides from cracking catalyst regenerator flue gas using particulate alumina is enhanced by employing a zeolitic cracking catalyst containing little or no silica in the catalyst matrix.

6 Claims, No Drawings

RESTRICTING SILICA CONTENT OF CATALYST INVENTORY TO PREVENT ALUMINA POISONING FOR SO$_x$ CONTROL

CROSS REFERENCE TO RELATED APPLICATIONS

This application is a continuation-in-part of our copending application Ser. No. 967,048, filed on Dec. 6, 1978, now abandoned.

BACKGROUND OF THE INVENTION

The present invention relates to a method for reducing pollutant gas levels in flue gases generated in catalyst regenerators in hydrocarbon catalytic cracking systems.

Modern hydrocarbon catalytic cracking systems use a moving bed or fluidized bed of a particulate catalyst. It is carried out in the absence of externally supplied molecular hydrogen, and is thereby distinguished from hydrocracking. The cracking catalyst is subjected to a continuous cyclic cracking reaction and catalyst regeneration procedure. In a fluidized catalytic cracking (FCC) system, a stream of hydrocarbon feed is contacted with fluidized catalyst particles in a hydrocarbon cracking zone, or reactor, usually at a temperature of about 425°–600° C. The reactions of hydrocarbons in the hydrocarbon stream at this temperature result in deposition of carbonaceous coke on the catalyst particles. The resulting fluid products are thereafter separated from the coked catalyst and are withdrawn from the cracking zone. The coked catalyst is then stripped of volatiles and is cycled to a catalyst regeneration zone. In the catalyst regenerator, the coked catalyst is contacted with a gas, such as air, which contains a predetermined concentration of molecular oxygen to burn off a desired portion of the coke from the catalyst and simultaneously to heat the catalyst to a high temperature desired when the catalyst is again contacted with the hydrocarbon stream in the cracking zone. After regeneration, the catalyst is cycled to the cracking zone, where it is used to vaporize the hydrocarbons and to catalyze hydrocarbon cracking. The flue gas formed by combustion of coke in the catalyst regenerator is removed from the regenerator. It may be treated to remove particulates and carbon monoxide from it, after which it is normally passed into the atmosphere. Concern with control of pollutants in flue gas has resulted in a search for improved methods for controlling such pollutants. In the past, concern has centered on sulfur oxides and carbon monoxide. More recently, concern over pollutants has been extended to the level of nitrogen oxides in some cracking systems, particularly in systems using complete combustion-type regeneration.

The amount of conversion obtained in an FCC cracking operation is the volume percent of fresh hydrocarbon feed changed to gasoline and lighter products during the conversion step. The end boiling point of gasoline for the purpose of determining conversion is conventionally defined as 221° C. Conversion is often used as a measure of the severity of a commercial FCC operation. At a given set of operating conditions, a more active catalyst gives a greater conversion than does a less active catalyst. The ability to provide higher conversion in a given FCC unit is desirable in that it allows the FCC unit to be operated in a more flexible manner. Feed throughput in the unit can be increased, or alternatively a higher degree of conversion can be maintained with a constant feed throughput rate. The type of conversion, i.e., selectivity, is also important in that poor selectivity results in less naphtha, the desired cracked product, and higher gas and coke makes.

One conventional mode of FCC catalyst regeneration currently used in many systems is an incomplete combustion mode. In such systems, referred to herein as "standard regeneration" systems, a substantial amount of coke carbon is left on regenerated catalyst passed from the FCC regeneration zone to the cracking zone after regeneration, i.e., more than 0.2 weight percent carbon, usually about 0.25 to 0.45 weight percent carbon. The flue gas removed from an FCC regenerator operating in a standard regeneration mode is characterized by a relatively high carbon monoxide/carbon dioxide concentration ratio. The atmosphere in much or all of the regeneration zone is a reducing atmosphere because of the presence of substantial amounts of unburned coke carbon and carbon monoxide.

In general, reducing the level of carbon on regenerated catalyst below about 0.2 weight percent has been difficult. Prior to the introduction of zeolite catalyst, there was little incentive to attempt to remove substantially all coke carbon from the catalyst, since even a fairly high carbon content had little adverse effect on the activity and selectivity of commercial amorphous silica-alumina catalysts. Most of the FCC cracking catalysts now used, however, contain crystalline aluminosilicate zeolites, or molecular sieves. Zeolite-containing catalysts have usually been found to have relatively higher activity and selectivity when their coke carbon content, after regeneration, is relatively low. An incentive has thus arisen for attempting to reduce the coke content of regenerated FCC catalyst to a very low level, e.g., below 0.2 weight percent.

Carbon monoxide is one of the pollutant gases found in FCC regenerator flue gas. Several methods have been suggested for burning substantially all carbon monoxide to carbon dioxide during regeneration, in order to avoid air pollution by the carbon monoxide, recover heat and prevent afterburning. Among the procedures suggested for use in obtaining complete carbon monoxide combustion in an FCC regenerator have been: (1) increasing the amount of oxygen introduced into the regenerator relative to standard regeneration; and either (2) substantially increasing the average operating temperature in the regenerator or (3) including various carbon monoxide oxidation promoting metals in the system to promote carbon monoxide burning in the regenerator. Combustion-promoting metals have been employed in two ways: (a) in low concentration on essentially all the particulate solids circulating in the cracking system, i.e., on the catalyst; or (b) in high concentrations on only a very small fraction (less than 1%) of the particulate solids in the cracking system, often with the promoter metal supported on low-acidity, essentially noncatalytic solids. Various other solutions have also been directed to the problem of afterburning of carbon monoxide, such as addition of extraneous combustibles or use of water or heat-accepting solids to absorb the heat generated by combustion of carbon monoxide in an afterburning mode. Because of their expense and activity, the promoting metals are used at very low concentration on promoted particles when associated with essentially all the particulate solids in a cracking system. Promoter concentrations for platinum are typically 0.1 to 10 ppm (weight) in promoted catalysts, or when the promoting metal is supplied to the system as an additive in the feed, e.g., as a feed-soluble compound.

Complete combustion regeneration systems using a high temperature in the catalyst regenerator, rather than oxidation-promoting metals, to accomplish complete carbon monoxide combustion have not been found as entirely satisfactory as promoted systems. Some of the heat generated by carbon monoxide combustion is usually lost in the flue gas. Much of the CO combustion takes place in a dilute catalyst phase in an afterburning mode, and the resulting high temperature in the regenerator dilute phase can permanently adversely affect the activity and selectivity of the FCC catalyst.

Because of activity limitations, combustion promoting metals, such as platinum, must be incorporated into particulate solids in relatively higher concentrations, e.g., 0.01 to 1 weight percent, when the promoted particles constitute a very small fraction (less than 1%) of the total solids inventory in a cracking system. When using carbon monoxide combustion promoting metals associated with a very small fraction of the total particulate solids inventory in a cracking system (including both particulate catalyst and any other solids in the system), essentially complete carbon monoxide combustion has been obtained commercially. Low levels of coke on regenerated catalyst, another desirable result, have also been obtained. On the other hand, the amount of undesirable nitrogen oxides has increased quite substantially in the flue gas from catalyst regenerators using promoting metals contained on less than 1% of the circulating particulate solids. This has created a serious air pollution problem in disposing of the flue gas.

As mentioned above, the art has suggested various modes of addition of Group VIII noble metals and other carbon monoxide combustion promoting metals to FCC systems. In U.S. Pat. No. 2,647,860 it is proposed to add 0.1–1 weight percent chromic oxide to an FCC catalyst to promote combustion of carbon monoxide to carbon dioxide and to prevent afterburning. U.S. Pat. No. 3,364,136 proposes to employ particles containing a small pore (3–5 A.) molecular sieve with which is associated a transition metal from Groups IB, IIB, VIB, VIIB and VIII of the Periodic Table, or compounds thereof, such as a sulfide or oxide. Representative metals disclosed include chromium, nickel, iron, molybdenum, cobalt, platinum, palladium, copper and zinc. The metal-loaded, small-pore zeolite may be used in an FCC system in physical mixture with cracking catalysts containing larger-pore zeolites active for cracking, or the small-pore zeolite may be included in the same matrix with zeolites active for cracking. The small-pore, metal-loaded zeolites are supplied for the purpose of increasing the $CO_2/CO$ ratio in the flue gas produced in the FCC regenerator. In U.S. Pat. No. 3,788,977, it is proposed to add uranium or platinum impregnated on an inorganic oxide such as alumina to a FCC system, either in physical mixture with FCC catalyst or incorporated into the same amorphous matrix as a zeolite used for cracking. Uranium or platinum is added for the purpose of producing gasoline fractions having high aromatics contents, and no effect on carbon monoxide combustion when using the additive is discussed in the patent. In U.S. Pat. No. 3,808,121 it is proposed to supply large-size particles containing a carbon monoxide combustion promoter metal in an FCC regenerator. The smaller-size catalyst particles are cycled between the FCC cracking reactor and the catalyst regenerator, while, because of their size, the larger promoter particles remain in the regenerator. Carbon monoxide oxidation promoters such as cobalt, copper, nickel, manganese, copper, chromite, etc., impregnated on an inorganic oxide such as alumina are disclosed for use. Belgian patent publication No. 820,181 suggests using catalyst particles containing platinum, palladium, iridium, rhodium, osmium, ruthenium or rhenium or mixtures or compounds thereof to promote carbon monoxide oxidation in an FCC catalyst regenerator. An amount between a trace and 100 ppm of the active metal is added to FCC catalyst particles by incorporation during catalyst manufacture or by addition of a compound of the metal to the hydrocarbon feed to an FCC unit using the catalyst. The publication asserts that addition of the promoter metal increases coke and hydrogen formation during cracking. The catalyst containing the promoter metal can be used as such or can be added in physical mixture with unpromoted FCC cracking catalyst.

U.S. Pat. Nos. 4,072,600 and 4,093,535 disclose the use of combustion-promoting metals in catalytic cracking systems in concentrations of 0.01 to 50 ppm, based on total catalyst inventory. The combustion-promoting metals are disposed on the catalyst particles.

The hydrocarbon feeds processed in commercial FCC units normally contain sulfur, usually termed "feed sulfur." It has been found that about 2–10% or more of the feed sulfur in a hydrocarbon feedstream processed in an FCC system is invariably transferred from the feed to the catalyst particles as a part of the coke formed on the catalyst particles during cracking. The sulfur deposited on the catalyst, herein termed "coke sulfur," is passed from the cracking zone on the coked catalyst into the catalyst regenerator. About 2–10% or more of the feed sulfur is continuously passed from the cracking zone into the catalyst regeneration zone in the coked catalyst. In an FCC catalyst generator, sulfur contained in the coke is burned along with the coke carbon and hydrogen, forming gaseous sulfur dioxide and sulfur trioxide, which are conventionally removed from the regenerator in the flue gas.

Most of the feed sulfur does not become coke sulfur in the cracking reactor. Instead, it is converted either to normally gaseous sulfur compounds such as hydrogen sulfide and carbon oxysulfide, or to normally liquid organic sulfur compounds. All these sulfur compounds are carried along with the vapor cracked hydrocarbon products recovered from the cracking reactor. About 90% or more of the feed sulfur is continuously removed from the cracking reactor in the stream of processed, cracked hydrocarbons, with about 40–60% of this sulfur being in the form of hydrogen sulfide. Provisions are conventionally made to recover hydrogen sulfide from the effluent from the cracking reactor. Typically, a very-low-molecular-weight off-gas vapor stream is separated from the $C_3+$ liquid hydrocarbons in a gas recovery unit, and the off-gas is treated, as by scrubbing it with an amine solution, to remove the hydrogen sulfide. Removal of sulfur compounds such as hydrogen sulfide from the fluid effluent from an FCC cracking reactor is relatively simple and inexpensive compared to removal of sulfur oxides from an FCC regenerator flue gas by conventional methods. Moreover, if all the sulfur which must be recovered from an FCC operation could be recovered in a single recovery operation performed on the reactor off-gas, the use of two separate sulfur recovery operations in an FCC unit could be obviated.

It has been suggested to diminish the amount of sulfur oxides in FCC regenerator flue gas by desulfurizing a hydrocarbon feed in a separate desulfurization unit prior to cracking or to desulfurize the regenerator flue gas itself, by a conventional flue gas desulfurization procedure, after its removal from the FCC regenerator. Clearly, either of the foregoing alternatives requires an elaborate, extraneous processing operation and entails large capital and utilities expenses.

If sulfur normally removed from the FCC unit in the regenerator flue gas as sulfur oxides is instead removed from the cracking reactor as hydrogen sulfide along with the processed cracked hydrocarbons, the sulfur thus shifted to the reactor effluent constitutes simply a small increment to the large amount of hydrogen sulfide and organic sulfur invariably present in the reactor effluent. The small added expense, if any, of removing even as much as 5-15% more hydrogen sulfide from an FCC reactor off-gas by available means is substantially less than the expense of reducing the flue gas sulfur oxides level by separate feed desulfurization. Present commercial off-gas hydrogen sulfide recovery facilities can, in most if not all cases, handle any additional hydrogen sulfide which would be added to the off-gas if the sulfur normally in the regenerator flue gas were substantially all converted to hydrogen sulfide in the FCC reactor off-gas. It is accordingly desirable to direct substantially all feed sulfur into the fluid cracked products removal pathway from the cracking reactor and thereby reduce the amount of sulfur oxides in the regenerator flue gas.

It has been suggested, e.g., in U.S. Pat. No. 3,699,037, to reduce the amount of sulfur oxides in FCC regenerator flue gas by adding particles of Group IIA metal oxides and/or carbonates, such as dolomite, MgO or $CaCO_3$, to the circulating catalyst in an FCC unit. The Group IIA metals react with sulfur oxides in the flue gas to form solid sulfur-containing compounds. The Group IIA metal oxides lack physical strength. Regardless of the size of the particles introduced, they are rapidly reduced to fines by attrition and rapidly pass out of the FCC unit with the catalyst fines. Thus, addition of dolomite and the like Group IIA materials is essentially a once-through process, and relatively large amounts of material must be continuously added in order to reduce the level of flue gas sulfur oxides.

It has also been suggested, e.g., in U.S. Pat. No. 3,835,931, to reduce the amount of sulfur oxides in an FCC regenerator flue gas by impregnating a Group IIA metal oxide onto a conventional silica-alumina cracking catalyst. The attrition problem encountered when using unsupported Group IIA metals is thereby reduced. However, it has been found that Group IIA metal oxides, such as magnesia, when used as a component of cracking catalysts, have a rather pronounced undesirable effect on the activity and selectivity of the cracking catalysts. The addition of a Group IIA metal to a cracking catalyst results in two particularly noticeable adverse consequences relative to the results obtained in cracking without the presence of the Group IIA metals: (1) the yield of the liquid hydrocarbon fraction is substantially reduced, typically by greater than 1 volume percent of the feed volume; and (2) the octane rating of the gasoline or naphtha fraction (24°-221° C. boiling range) is substantially reduced. Both of the above-noted adverse consequences are seriously detrimental to the economic viability of an FCC cracking operation, so that even complete removal of sulfur oxides from regenerator flue gas would not normally compensate for the simultaneous losses in yield and octane which result from adding Group IIA metals to an FCC catalyst.

Alumina has been a component of many FCC and moving-bed cracking catalysts, but normally in intimate chemical combination with silica. Alumina itself has low acidity and is generally considered to be undesirable for use as a cracking catalyst. The art has taught that alumina is not selective, i.e., the cracking hydrocarbon products recovered from an FCC or other cracking unit using an alumina catalyst would not be desired valuable products, but would include, for example, relatively large amounts of $C_2$ and lighter hydrocarbon gases.

U.S. Pat. No. 4,071,436 discloses the use of alumina for reducing the amount of sulfur oxides in the flue gas formed during cracking catalyst regeneration. The alumina can be used in the form of a particulate solid mixed with cracking catalyst particles. In some cases, alumina contained in the cracking catalyst particles is also suitable; however, alumina contained in conventional cracking catalyst is usually not very active, since it is intimately mixed with a large fraction of silica.

U.S. Pat. No. 4,115,250 and No. 4,115,251 disclose the synergistic use of oxidation-promoting metals for carbon monoxide burning in combination with the use of alumina for reducing the amount of sulfur oxides in cracking catalyst regenerator flue gas. When alumina and highly active oxidation-promoting metals are both included in the same particle, alumina in the particle is ineffective for removing sulfur oxides from the regenerator flue gas, especially in the presence of even a small amount of carbon monoxide. On the other hand, when the alumina and combustion-promoting metal are used on separate particles circulated together in a cracking system in physical admixture, the ability of the alumina to reduce the level of sulfur oxides in the flue gas can be considerably enhanced.

In carrying out the method for reducing the level of sulfur oxides in catalyst regenerator flue gas using alumina, in general as disclosed in U.S. Pat. No. 4,017,436, No. 4,115,250 and No. 4,115,251 under commercial conditions, we have now noted that the overall concentration of silica in the particulate solids inventory in a catalytic cracking system exerts an unexpected effect on the activity and stability of alumina in the inventory with respect to the capacity of the alumina to form sulfur-containing solids in a catalyst regenerator, regardless of the type of association with alumina or other materials with which the silica is present in the catalyst inventory, except for silica in the form of zeolitic crystalline aluminosilicates. Previously, it was believed that contamination of alumina in the system by silica presented a problem only if the silica were introduced into the circulating particulate solids inventory already chemically combined with alumina or, at least, only if it were introduced in the same particles as the alumina. We have now found that, under commercial catalytic cracking and regeneration conditions, silica can migrate from particles of high silica concentration to particles of low or zero silica concentration during circulation of particles having different silica concentrations in physical admixture in a cracking system. Silica which is subject to such migration may be termed "amorphous" or "non-crystalline" silica, to distinguish it from silica in the form of zeolitic crystalline aluminosilicates, which is relatively stable and is subject to little or no migration under commercial conditions. The present invention is directed, in part, to overcoming the deactivation of alumina resulting from silica migration from one particle to another in the particulate solids inventory in a catalytic cracking system.

SUMMARY OF THE INVENTION

In an embodiment, the present invention concerns a process for cracking hydrocarbons in the absence of externally supplied molecular hydrogen comprising the steps of: cycling acidic cracking catalyst particles between a cracking zone and a regeneration zone, the catalyst particles comprising from 5 to 50 weight percent of a zeolitic crystalline aluminosilicate associated with a porous matrix, the matrix including less than 40 weight percent silica; cracking a sulfur-containing hydrocarbon stream in contact with the catalyst particles in the cracking zone; forming a sulfur oxides-containing flue gas in the regeneration zone by burning coke off the catalyst particles with a molecular oxygen-containing gas; lowering the amount of sulfur oxides in the flue gas by reacting sulfur oxides in the regeneration zone with alumina included in a particulate solid other than the catalyst particles to form a sulfur-containing solid, the particulate solid being physically admixed with the catalyst particles, the particulate solid including at least 90 weight percent alumina; forming hydrogen sulfide in the cracking zone by reacting the sulfur-containing solid with the hydrocarbon stream; and removing the hydrogen sulfide and the hydrocarbon stream from the cracking zone.

We have found that a process employing alumina particles to lower the concentration of sulfur oxides in cracking catalyst regenerator flue gas can be made unexpectedly more efficient and stable by employing a cracking catalyst containing a zeolite and having little or no silica in its matrix. The use of a catalyst containing little or no silica permits the alumina particles to function at a higher SOx adsorption level for a longer period of use without deactivation.

Poisoning of the active alumina particles by contamination with silica migrating from the catalyst matrix is prevented, according to the invention, by maintaining the silica content of the catalyst matrix below 40 weight percent. It has been found that active alumina particles lose capacity to react with sulfur oxides when contaminated with silica. This can be prevented, or at least substantially reduced, by employing with the alumina adsorbent particles a cracking catalyst which has an active crystalline aluminosilicate component and a matrix or binder with little or no silica.

DETAILED DESCRIPTION OF THE INVENTION

The present invention is used in connection with a fluid catalyst cracking process for cracking hydrocarbon feeds. The same hydrocarbon feeds normally processed in commercial FCC systems may be processed in a cracking system employing the present invention. Suitable feedstocks include, for example, petroleum distillates or residuals, either virgin or partially refined. Synthetic feeds such as coal oils and shale oils are also suitable. Suitable feedstocks normally boil in the range from about 204°–593° C. or higher. A suitable feed may include recycled hydrocarbons which have already been subjected to cracking.

The cracking catalysts which are suitable for use in the process of this invention are those which include at least one component recognized by those skilled in the art to be suitably acidic and active for catalyzing cracking of hydrocarbons in the absence of externally supplied molecular hydrogen. Particularly suitable cracking components are the acidic, zeolitic crystalline aluminosilicates such as X-type and X-type faujasites, preferably in the hydrogen form, the rare earth form, or other equal stable form. ZSM-type crystalline aluminosilicates can also be used. Zeolitic crystalline aluminosilicates are preferred acidic cracking components in that silicon included in zeolites is not particularly subject to migration between particles during use in catalytic cracking, with the resulting poisoning of alumina activity for sulfur oxides reduction. Preferably, the particulate solids inventory used in a system in an embodiment of the invention includes at least 75 weight percent of catalyst particles containing from 5 to 50 weight percent of a zeolitic crystalline aluminosilicate. The matrix or binder must contain less than 40 weight percent silica. It may be desirable, for economic reasons, to use a mixture of catalysts, one of which contains a zeolitic cracking component, while the other contains only relatively inexpensive amorphous silica-alumina in systems where catalyst must be added frequently as a result of high feed metals levels or the like. In such cases, the total amorphous silica concentration in the cracking catalyst must be maintained at less than 40 weight percent, excluding crystalline aluminosilicate components.

A preferred catalyst for use in the present process is one which comprises an acidic zeolitic crystalline aluminosilicate cracking component associated with a matrix containing at least 90 weight percent alumina. Regardless of the matrix or binder material used, the average amount of crystalline aluminosilicate in catalyst particles is preferably from about 5 to about 50 weight percent. In a particularly preferred embodiment, using essentially solely alumina as a matrix, the zeolite can be combined with the alumina to form catalyst particles in any suitable conventional manner. The zeolite may be stabilized or otherwise ion-exchanged either before or after combination with the alumina.

The zeolite may be formed by treatment of kaolin clay, as by slurrying the clay, sizing and spray drying, followed by treatment with caustic at elevated temperature for a time sufficient to generate a fraction of the desired zeolite in the treated clay matrix. The zeolite component in the particles can then be converted to the ammonium and/or rare earth form by ion-exchange. Of course, there is usually still a substantial noncrystalline silica content in catalysts manufactured in this manner, and it may be necessary to add further alumina or alumina precursor. The zeolite can alternatively be manufactured separately and added to the desired matrix or binder material. Conventional binders such as clays, acid-treated clays, alumina-extended clays, etc., can be used as the binder, or as a component of the binder, if the silica level in the resulting material is not thereby increased above an acceptable level. As noted above, alumina essentially free from silica is a particularly preferred binder for the zeolite component.

Cracking conditions employed in the cracking or conversion step in an FCC system are frequently provided in part by pre-heating or heat-exchanging hydrocarbon feeds to bring them to a temperature of about 315°–400° C. before introducing them into the cracking zone; however, pre-heating of the feed is not essential. Cracking conditions usually include a catalyst/hydrocarbon weight ratio of about 3–10. A hydrocarbon weight space velocity in the cracking zone of about 5–50 per hour is preferably used. The average amount of coke contained in the catalyst after contact with the hydrocarbons in the cracking zone, when the catalyst is passed to the regenerator, is preferably between about 0.5 weight percent and about 2.5 weight percent, depending in part on the carbon content of regenerated catalyst in the particular system, as well as the heat balance of the particular system. Operating temperatures of 425°–705° C. are generally suitable, with the range 482°–595° C. being preferred. Pressures of atmospheric to 3 atmospheres are generally suitable, with 1–2 atmospheres preferred.

The catalyst regeneration zone used in an FCC system employing an embodiment of the present invention may be of conventional design. Preferably, the total pressure in the regeneration zone is maintained at at least 20 psig. The gaseous atmosphere within the regeneration zone normally includes a mixture of gases in concentrations which vary according to the locus within the regenerator. The concentrations of gases also vary according to the coke concentration on catalyst particles entering the regenerator and according to the amount of molecular oxygen and steam passed into the regenerator. Generally, the gaseous atmosphere in a regenerator contains 5–25% steam, varying amounts of oxygen, carbon monoxide, carbon dioxide and nitrogen. The present invention is applicable in cases in which an oxygen-containing and nitrogen-containing gas, such as air, is employed for combustion of coke in the catalyst regenerator. As will be appreciated by those skilled in the art, air is essentially invariably employed to provide the oxygen needed for combustion in FCC regenerators.

An oxidation promoting component may be employed to aid catalyst regeneration in carrying out at least some embodiments of the method of the present invention. Thermally induced combustion of carbon monoxide can also be used to provide a low carbon monoxide level and a high molecular oxygen level in regenerator flue gas and a low concentration of carbon on regenerated catalyst. Combustion promoting metals which are suitable include platinum, palladium, iridium, rhodium, osmium, ruthenium, copper, manganese, etc., and compounds thereof, such as the oxides, sulfides, sulfates, etc. More than one of the foregoing metals or metal compounds can be used. For example, mixtures of platinum and palladium are suitable. The effect of the above-mentioned carbon monoxide combustion promoter metals may be enhanced by combining them with small amounts of other metals or metalloids, particularly rhenium, tin, germanium or lead. The oxidation component may be used in several ways, such as in: (1) a portion of the acidic cracking catalyst; (2) a finely divided, porous inorganic oxide, such as alumina, sized suitably for circulation in an FCC system, but not highly acidic; or (3) both on acidic catalyst and also on another finely divided, low-acidity solid physically mixed and calculated with the catalyst particles. The total amount of the promoting metal or metal compound used in the cracking system is usually kept in the range from 0.1 to 100 parts per million, by weight, calculated on an elemental metal basis, of the total particulate solids inventory in a cracking unit. Platinum is a particularly preferred combustion promoter. The total amount of platinum used in an FCC system with respect to the circulating particulate solids inventory is preferably between about 0.1 and 10 parts per million by weight. Particulate solids, promoted with an oxidation component, if otherwise distinct in composition in whole or in part (aside from the promoting metal) from other particles in the system, may be formed from any material which is suitable for circulation in an FCC system. Particularly suitable materials are the porous inorganic oxides, such as alumina, or mixtures of two or more inorganic oxides, such as silica-alumina, natural and synthetic clays and the like, crystalline aluminosilicate zeolites, etc. Silica can be used, but, because of its tendency to adversely affect the sulfur oxides capacity of active alumina in the system, it is preferred not to use silica. Gamma-alumina is particularly good as a support for the carbon monoxide oxidation component. The metal or metal compound can be added to a particulate solid to form a promoted particulate solid in any suitable manner, as by impregnation or ion exchange, or can be added to a precursor of a particulate solid, as by coprecipitation from an aqueous solution with an inorganic oxide precursor sol. The material containing the oxidation component can be formed into particles of a size suitable for use in an FCC system by conventional means, such as spray-drying, crushing of larger particles to the desired size, etc. This shaping can be done before or after incorporation of the oxidation component.

Preferably, at least a major portion of the combustion of all carbon monoxide formed in the catalyst regenerator takes place in a dense catalyst phase region within the regenerator. By a dense catalyst phase region is meant that the catalyst density in the region is at least 10 pounds per cubic foot. Sufficient oxygen is preferably introduced into the regeneration zone so that a minimum molecular oxygen content of 0.5 volume percent, particularly preferably at least 1.0 volume percent, is maintained in the atmosphere in the regeneration zone. The minimum oxygen concentration may normally be measured in the flue gas exiting the regeneration vessel or vessels. A sufficient amount of coke is preferably burned off the catalyst in the regeneration zone so that the average concentration of carbon on regenerated catalyst cycled from the regeneration zone to the cracking zone is below 0.2 weight percent and particularly preferably below 0.1 weight percent. The average temperature of particles in the dense-phase region of the catalyst regeneration zone is preferably maintained below 680° C.

removed from the flue gas in a catalyst regeneration zone by reacting sulfur oxides, e.g., sulfur trioxide, with alumina in the regeneration zone. The alumina used for the reaction has a surface area of at least 50 $m^2/g$, e.g., gamma- or eta-alumina. Suitable alumina is not in intimate combination with more than 40 weight percent silica, relative to the alumina concentration in a given particle, and preferably the alumina used is substantially free from admixture with silica. Alumina from any source is suitable for use in the present method if it contains an average of about 0.1 to 100 weight percent of "reactive alumina", as determined by treating particles containing the alumina by the following steps:

(1) passing a stream of a gas mixture containing, by volume, 10% water, 1% hydrogen sulfide, 10% hydrogen and 79% nitrogen over the solid particle continuously at a temperature of 649° C. and atmospheric pressure until the weight of the solid particle is substantially constant;

(2) passing a stream of a gas mixture containing, by volume, 10% water, 15% carbon dioxide, 2% oxygen and 73% nitrogen over the solid particle resulting from step (1) at a temperature of 649° C. and atmospheric pressure until the weight of the solid particle is substantially constant, the weight of the particle at this time being designated "Wa"; and (3) passing a stream of a gas mixture containing, by volume, 0.05% sulfur dioxide, and, in addition, the same gases in the same proportions as used in step (2), over the solid particle resulting from step (2) at a temperature of 649° C. and atmospheric pressure until the weight of the solid particle is substantially constant, the weight of the solid particle at this time being designated "Ws".

The weight fraction of reactive alumina in the solid particle, designated "Xa," is determined by the formula $$Xa = \frac{Ws - Wa}{Wa} \times \frac{\text{Molecular Wt. Alumina}}{3 \times \text{Molecular Wt. Sulfur Trioxide}}$$

The alumina used is included in particulate solids other than catalyst particles which are physically suitable for circulation in the cracking system. Suitable particles normally have an alumina content of at least 60 weight percent and, preferably, the alumina content of such particles is 90 weight percent or more. In a particularly preferred embodiment, the particles consist of at least 99 weight percent alumina. Alumina can be formed into particles of suitable size for circulation with FCC catalyst in an FCC system for spray-drying, crushing larger particles, etc.

Particulate alumina can be added to a cracking system and circulated in physical mixture with cracking catalyst. The amount of separate, alumina-containing particles added is preferably 25 weight percent, or less, of the total particulate solids inventory circulating in the cracking system. The addition of an amount of alumina between 1.0 and 25 weight percent of the total particulate solids inventory is particularly preferred. The size, shape and density of separate, alumina-containing particles used along with a catalyst is preferably controlled to provide particles which circulate in substantially the same manner as conventional catalyst particles, e.g., beads are used in a moving bed bead-catalyst unit, whereas 50–100 micron diameter particles are quite suitable in an FCC unit. Alumina reacts with sulfur trioxide or sulfur dioxide and oxygen in the cracking catalyst regenerator to form at least one solid compound including sulfur and aluminum, such as a sulfate of aluminum. In this way, sulfur oxides are removed from the regenerator atmosphere and are not carried out of the regenerator in the flue gas.

Particles containing the solid aluminum- and sulfur-containing material are passed to the cracking zone along with the other particulate solids. In the cracking zone, alumina is regenerated and hydrogen sulfide is formed by contacting the sulfur-containing solid with the stream of hydrocarbon being treated in the cracker. In addition to forming hydrogen sulfide, the reaction between the sulfur- and aluminum-containing solid and the hydrocarbon feed may produce some other sulfur compound such as carbon oxysulfide, organic sulfides, etc., which are gaseous at cracking conditions. The resulting vapor-phase sulfur compounds exit the cracking zone as a part of the stream of cracked hydrocarbons, along with vapor-phase sulfur compounds formed directly from sulfur in the hydrocarbon feed during the cracking reactions. Off-gas subsequently separated from the cracked hydrocarbon stream thus includes hydrogen sulfide formed directly from the feed sulfur and hydrogen sulfide formed by reaction of the sulfur- and aluminum-containing solid with the hydrocarbon stream in the cracking zone.

It is essential to operation of embodiments of the present invention that particles which contain alumina intended to be reacted with sulfur trioxide in the regenerator must be substantially free from any of the noble metals or noble metal compounds described above as suitable for use in carbon monoxide combustion promotion, that is, platinum, palladium, iridium, rhodium, osmium, ruthenium and copper. It has been found that the presence of these metals or compounds thereof in alumina-containing particles to be used for reaction with sulfur oxides is actually detrimental to the capacity of the alumina to form solid sulfur-containing materials in an FCC regenerator. Thus, when these metals are present on particles of alumina to be reacted with sulfur trioxide, the desired reaction of the sulfur trioxide to form a solid is impaired, contrary to one object of the invention.

The following Illustrative Embodiment describes a preferred mode for carrying out the present invention.

ILLUSTRATIVE EMBODIMENT

A conventional, commercial FCC system is employed. The capacity of the cracking unit is about 20,000 barrels per day. A cracking catalyst is prepared by combining an alumina gel with 15 weight percent of a stabilized hydrogen-Y-type zeolitic crystalline aluminosilicate and spray drying the mixture. The catalyst is introduced into the FCC unit mixed with a sufficient amount of a conventional particulate platinum-containing combustion promoter so that the total amount of platinum in the catalyst inventory is 1 part per million, by weight. An amount of gamma alumina particles sufficient to provide 10 weight percent of the total inventory of solids is added in circulation. A hydrocarbon feed boiling in the range 288° C. to 540° C. and containing 0.9 weight percent sulfur is cracked in the unit. A complete combustion mode of operation is maintained in the catalyst regenerator. An average dense bed temperature in the regenerator of 660° C. is used. Sufficient molecular oxygen is introduced to the regenerator so that flue gas leaving the regenerator contains 2.0 volume percent molecular oxygen and has a carbon dioxide/carbon monoxide volume ratio of 100. Sulfur components of the coke on the catalyst entering the regenerator are burned to sulfur oxides, which react with alumina in the gamma alumina particles to form a sulfur-containing solid. The regenerated alumina-matrix catalyst, containing 0.10 weight percent carbon and the sulfur-containing solid, is cycled to the cracking reactor. The amount of sulfur oxides in the flue gas leaving the catalyst regenerator is thereby substantially lower than would be expected in conventional operation of the cracking unit.

What is claimed is:

1. A process for cracking hydrocarbons in the absence of externally supplied molecular hydrogen, comprising steps of:
   (a) cycling acidic cracking catalyst particles between a cracking zone and a regeneration zone, said catalyst particles comprising from 5 to 50 weight percent of a zeolitic crystalline aluminosilicate associated with a porous matrix, said matrix including less than 40 weight percent silica;

(b) cracking a sulfur-containing hydrocarbon stream in contact with said catalyst particles in said cracking zone;

(c) forming a sulfur oxides-containing flue gas in said regeneration zone by burning coke off said catalyst particles with a molecular oxygen-containing gas;

(d) lowering the amount of gaseous sulfur oxides in said flue gas by reacting sulfur oxides in said regeneration zone with alumina included in a particulate solid other than said catalyst particles to form a sulfur-containing solid, said particulate solid being physically admixed with said catalyst particles in an amount of 0.1 to 25 weight percent of said catalyst particles, said particulate solid including at least 90 weight percent alumina;

(e) forming hydrogen sulfide in said cracking zone by reacting the sulfur-containing solid with said hydrocarbon stream; and (f) removing the hydrogen sulfide and said hydrocarbon stream from said cracking zone.

2. A process according to claim 1 wherein said particulate solid includes at least 99 weight percent alumina.

3. A process according to claim 1 wherein said matrix includes at least 90 weight percent alumina.

4. A process according to claim 1 wherein said matrix consists essentially of alumina.

5. A process according to claim 1 wherein regenerated catalyst particles removed from said regeneration zone include not more than 0.2 weight percent carbon.

6. A process according to claim 1 wherein said flue gas includes at least 0.5 volume percent molecular oxygen when removed from said regeneration zone.

* * * * *

UNITED STATES PATENT AND TRADEMARK OFFICE
CERTIFICATE OF CORRECTION

PATENT NO. : 4,259,176
DATED : March 31, 1981
INVENTOR(S) : William A. Blanton, Robert L. Flanders It is certified that error appears in the above-identified patent and that said Letters Patent are hereby corrected as shown below:

Col. 4, line 38-39 "generator" should read --regenerator--

Col. 6, line 9, "cracking" should read --cracked--

Col. 10, line 45 (omitted) Further according to the invention, sulfur oxides are Signed and Sealed this Twenty-fifth Day of August 1981

[SEAL]

Attest:

GERALD J. MOSSINGHOFF

Attesting Officer

Commissioner of Patents and Trademarks